(12) United States Patent
Lauwers et al.

(10) Patent No.: US 11,912,017 B2
(45) Date of Patent: Feb. 27, 2024

(54) PRINT CONSUMABLE DETECTION

(71) Applicant: Sanford, L.P., Atlanta, GA (US)

(72) Inventors: Annemie Lauwers, Hemiksem (BE); Hendrik Cannoodt, Lochristi (BE); Geert Van Aerde, Lokeren (BE); Dirk Van Britsom, Temse (BE); Peter D'Hoye, Ghent (BE)

(73) Assignee: Sanford, L.P., Atlanta, GA (US)

( * ) Notice: Subject to any disclaimer, the term of this patent is extended or adjusted under 35 U.S.C. 154(b) by 0 days.

(21) Appl. No.: 17/812,705

(22) Filed: Jul. 14, 2022

(65) Prior Publication Data

US 2023/0015023 A1 Jan. 19, 2023

Related U.S. Application Data

(60) Provisional application No. 63/223,443, filed on Jul. 19, 2021.

(51) Int. Cl.
| | | |
|---|---|---|
| *B41J 11/00* | (2006.01) | |
| *B41J 3/407* | (2006.01) | |
| *B41J 15/04* | (2006.01) | |
| *B41J 29/393* | (2006.01) | |
| *B41J 29/46* | (2006.01) | |
| *G06F 3/12* | (2006.01) | |
| *G06K 19/07* | (2006.01) | |

(52) U.S. Cl.
CPC ........... *B41J 11/009* (2013.01); *B41J 3/4075* (2013.01); *B41J 15/044* (2013.01); *B41J 29/393* (2013.01); *B41J 29/46* (2013.01); *G06F 3/1219* (2013.01); *G06F 3/1239* (2013.01); *G06K 19/0723* (2013.01); *B41J 2029/3937* (2013.01)

(58) Field of Classification Search
None
See application file for complete search history.

(56) References Cited

U.S. PATENT DOCUMENTS

| | | | |
|---|---|---|---|
| 6,802,659 | B2 | 10/2004 | Cremon et al. |
| 2002/0191998 | A1* | 12/2002 | Cremon ...................... B41J 5/30 400/70 |
| 2005/0024465 | A1* | 2/2005 | Kobayashi ............. B41J 3/4075 347/107 |
| 2006/0267765 | A1* | 11/2006 | Morton .............. G06K 7/10326 340/572.1 |

(Continued)

*Primary Examiner* — Andrew H Lam
(74) *Attorney, Agent, or Firm* — Eversheds Sutherland (US) LLP

(57) ABSTRACT

A print consumable may include a rotatable core, a roll of dispensable print substrate, and a radio-frequency identification (RFID) tag. The roll of the dispensable print substrate may be dispensably secured to the core. The RFID tag may be secured to the core and configured to rotate about a core axis. The RFID tag includes an RFID antenna coupled to an RFID chip. The RFID chip may include a print counter, a stock-keeping unit (SKU) code, and a consumable authentication code. A print system may include a housing, a holder to hold the print consumable, a print head, a transceiver, a trace antenna for reading an RFID tag of the print consumable, and a controller. The controller may be configured to receive a signal from the transceiver indicative of one or more of the print counter, the SKU code, and the consumable authentication code received from the RFID antenna.

19 Claims, 7 Drawing Sheets

(56) References Cited

U.S. PATENT DOCUMENTS

2012/0226907 A1\* 9/2012 Hohberger ................ G07F 7/12
                                                          713/168
2021/0039404 A1\* 2/2021 Kamiya ................... B41J 11/70

\* cited by examiner

PRINT CONSUMABLE DETECTION

CROSS-REFERENCE TO RELATED APPLICATIONS

The present application claims the benefit of U.S. Provisional Ser. No. 63/223,443, filed on Jul. 19, 2021, which is incorporated by reference in its entirety.

BACKGROUND

Technical Field

The present disclosure generally relates to label printers, and print consumables for use in label printers.

Description of the Related Art

Consumables such as rolls or cassettes may be used with printers. For example, a roll may include a supply of tape, and such a roll may be received within a label printer for sequentially printing and dispensing printed labels. For example, the tape may include an image-receiving layer and a backing layer, which are secured to one another via an adhesive layer. Such label printers may include a cutting mechanism for cutting off a portion of the tape after an image has been printed onto the image-receiving layer so that the portion of tape having the image can be used as a label. After the tape has been cut, the cut portion of the tape is pulled from the printer through a slit in the printer housing. The backing layer can then be removed allowing the image-receiving layer to be secured to an object using the adhesive layer.

The tape may be of a direct thermal type on which printing is achieved by direct application of heat from printing elements on the print head. Alternatively, an ink ribbon may be provided, whereby ink is transferred from the ribbon to an image receiving tape by application of heat to the ink ribbon via printing elements on the print head. The cassette may include a roll of die cut labels rather than a continuous tape.

Conventional print systems may use mechanical features to secure consumables, and to only allow authentic consumables to be received, such as holes, tabs, or the like, on interfacing parts of consumables. However, such features may be replicable by unauthorized parties. Electronic features, such as detection of a completed circuit when conducting pins or regions are mated, may also be used for authentication. However, such systems only provide a limited amount of information, and may not provide an accurate label count.

A need also remains to deter counterfeiters from introducing counterfeit rolls, to authenticate the source of a consumable placed in a printer, and provide an indication of authenticity of the consumable to the user. It is also desirable to detect the type of consumable and use appropriate print settings. Further, a need remains to provide an indication to a user of the remaining capacity of a consumable.

The printers and consumables described herein are directed at addressing one or more of the above-described difficulties.

SUMMARY

The present disclosure describes RFID-detectable print consumables, and systems and methods for print consumable detection.

In embodiments, a print consumable includes a rotatable core, a roll of dispensable print substrate, and a radio-frequency identification (RFID) tag. The core extends along a core axis. The roll of dispensable print substrate is dispensably secured to the core about the core axis. The RFID tag is secured to the core and configured to rotate about the core axis. The RFID tag includes an RFID antenna coupled to an RFID chip. The RFID chip includes a print counter, a stock-keeping unit (SKU) code, and a consumable authentication code.

In embodiments, a print system includes a housing, a holder to hold a print consumable, a print head, a transceiver, a trace antenna, and a controller. The housing defines a bay dimensioned to receive the print consumable. The holder is configured to secure the print consumable about a rotation axis aligned with the core axis. The print head is configured to print a pattern on the print substrate. The trace antenna is configured to read the RFID tag. The trace antenna extends in a direction transverse to the rotation axis. The transceiver is coupled to the trace antenna. The controller is coupled to the transceiver, and is configured to receive a signal from the transceiver indicative of one or more of the print counter, the SKU code, and the consumable authentication code received from the RFID antenna.

In embodiments, a method for authenticating a source of a print consumable includes receiving, by a controller, a signal from a transceiver indicative of a consumable authentication code from an RFID tag. The method further includes authenticating, by the controller, the source of the print consumable based on the consumable authentication code. The method further includes permitting or preventing operation of the print system, by the controller, in response to the source of the print consumable.

BRIEF DESCRIPTION OF THE DRAWINGS

The detailed description is set forth with reference to the accompanying drawings. The use of the same reference numerals may indicate similar to identical items. Various embodiments may utilize elements and/or components other than those illustrated in the drawings, and some elements and/or components may not be present in various embodiments. Elements and/or components in the figures are not necessarily drawn to scale.

DETAILED DESCRIPTION

Figure 1:
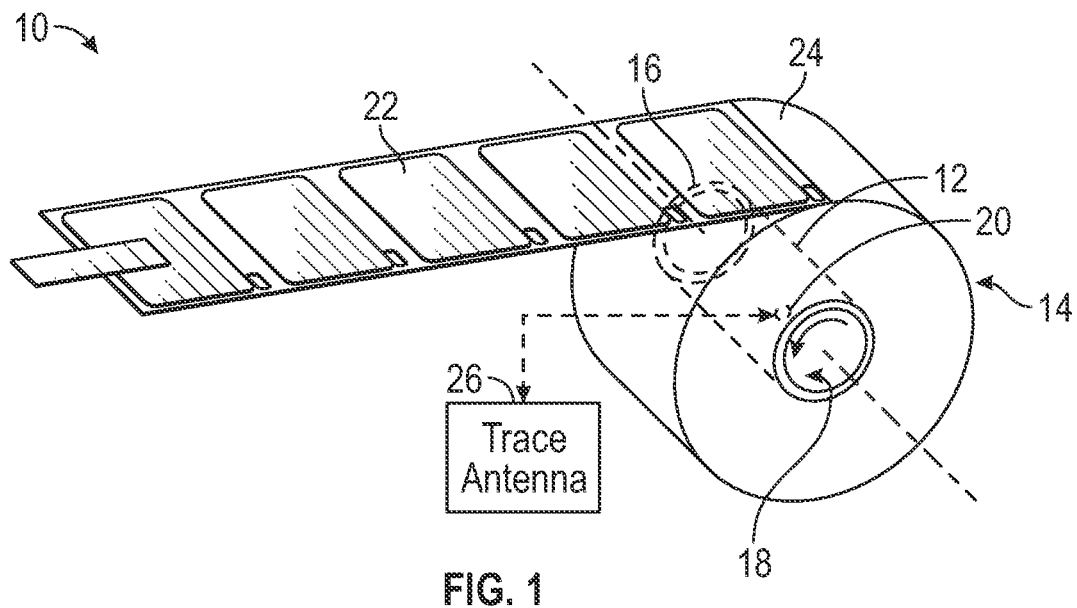
FIG. 1 is a perspective view of a print consumable including a rotatable core, a roll of dispensable print substrate, and a radio-frequency identification (RFID) tag.

The present disclosure includes non-limiting embodiments of RFID-detectable print consumables, and systems and methods for print consumable detection. The embodiments are described in detail herein to enable one of ordinary skill in the art to practice printing using the print consumable and associated systems and methods of authenticating the print consumable, detecting the consumable type and setting print settings, and counting the residual life of the print consumable, although it is to be understood that other embodiments may be utilized and that logical changes may be made without departing from the scope of the disclosure. Throughout the disclosure, depending on the context, singular and plural terminology may be used interchangeably.

Providing an RFID tag that rotates with a core of a roll of a print consumable provides multiple features such as counting the residual life of the consumable in course of printing, detecting the consumable type and setting appropriate print settings, and authenticating the source of the print consumable.

For example, in embodiments, a print consumable includes a rotatable core, a roll of dispensable print substrate, and a radio-frequency identification (RFID) tag. The core extends along a core axis. The roll of dispensable print substrate is dispensably secured to the core about the core axis. The RFID tag is secured to the core and configured to rotate about the core axis. The RFID tag includes an RFID antenna coupled to an RFID chip. The RFID chip includes a print counter, a stock-keeping unit (SKU) code, and a consumable authentication code.

Print systems may include a trace antenna for reading or writing information from the RFID tag, by receiving and sending signals from the RFID antenna of the RFID tag. Providing a transverse orientation between the trace antenna and the RFID tag may provide improved readability and reduction or prevention of RFID dead zones. For example, in embodiments, a print system includes a housing, a holder to hold a print consumable, a print head, a transceiver, a trace antenna, and a controller. The housing defines a bay dimensioned to receive the print consumable. The holder is configured to secure the print consumable about a rotation axis aligned with the core axis. The print head is configured to print a pattern on the print substrate. The trace antenna is configured to read the RFID tag. The trace antenna extends in a direction transverse to the rotation axis. The transceiver is coupled to the trace antenna. The controller is coupled to the transceiver, and is configured to receive a signal from the transceiver indicative of one or more of the print counter, the SKU code, and the consumable authentication code received from the RFID antenna.

The present disclosure describes methods for using print consumables and systems. For example, in embodiments, a method for authenticating a source of a print consumable includes receiving, by a controller, a signal from a transceiver indicative of a consumable authentication code from an RFID tag. The method further includes authenticating, by the controller, the source of the print consumable based on the consumable authentication code. The method further includes permitting or preventing operation of the print system, by the controller, in response to the source of the print consumable.

Thus, print consumables, systems, and methods according to the present disclosure may use the same RFID tag to provide multiple functions such as detecting the consumable type (or SKU), counting the units of printed media, and authenticating the source of the consumable. Various embodiments are described herein with reference to the figures.

FIG. 1 is a perspective view of a print consumable 10 including a rotatable core 12, a roll of dispensable print substrate 14, and a radio-frequency identification (RFID) tag 20. The core 12 extends along a core axis A. For example, the core 12 may extend between a first core end 16 and a second core end 18. In embodiments, the core 12 has a hollow cylindrical shape defining an outer surface and an inner surface. In other embodiments, the core 12 may have any suitable hollow or solid cross-section, for example, a curved or polygonal cross-section that is suitable for rotatably dispensing the print substrate 14 about the core 12. The core 12 may be made of plastic, paper, cardboard, or any suitable medium. In embodiments, the portion of the core 12 that carries the RFID tag does not include a material that may interfere with RF (radio-frequency) signals. For example, such a portion of the core 12 may be free of metals or alloys, or the entire core 12 may be free of metals or alloys.

The roll of dispensable print substrate 14 is dispensably secured to the core 12 about the core axis A. For example, the print substrate 14 may initially be wound about core 12, and as printing proceeds, portions of the print substrate 14 may be unwound by rotating core 12.

The dispensable print substrate 14 may include a print layer 22 and a backing layer 24. For example, the print layer 22 may be printed upon by a print head of a printing system, and the printed portion may be dispensed from the printer. In some embodiments, a user may retrieve the print layer 22 with the backing layer 24, and peel off the backing layer from the print layer. In other embodiments, a print system may separate the backing layer 24 from a portion of the print layer 22 on which a pattern has been printed, and a user may retrieve the separated portion of the print layer 22. The print layer 22 may have an adhesive to facilitate applying the printed portion to a substrate.

The print substrate 14 may include a substantially continuous print layer 22 with perforations, channels, or other features that permit removal of portions of the print layer. In some embodiments, no such features may be present, and the printed portion may be separated from the roll using a cutting tool, for example, a blade. The print layer 22 may include any suitable print medium, such as paper, a non-woven substrate, a polymeric substrate, a composite, or the like. In embodiments, the print layer 22 includes a thermal coating, on which ink-free patterns can be printed by a thermal print head. In embodiments, the print layer may receive patterns of ink, pigment, or colorant from a print head.

In some embodiments, the print substrate 14 includes a plurality of labels (portions or regions of print layer 22) secured to the backing layer. The labels 22 may have a permanent, tacky, removable, or readjustable adhesive layer for securing the labels to a desired substrate. Edges of neighboring and sequential labels 22 may be in contact, or may be spaced apart. Each label 22 may include or define a feature indicative of a single label. For example, each label 22 may be associated with a single hole in the print substrate 14, and a detection of a hole by a print system may indicate the advancing or printing of a single label by the print system.

As the print layer 22 of the print substrate 14 is dispensed by rotation of core 12 (or of the roll as a whole), the RFID tag 20 rotates with the core 12 about the core axis A. The RFID tag may be readable by a trace antenna 26, for example, of a print system in which the print consumable is used.

Figure 2:
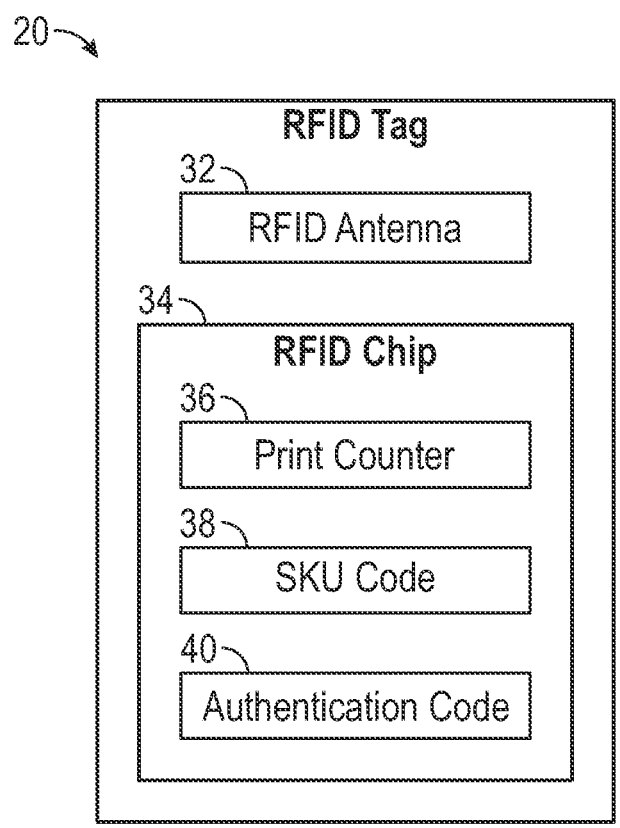
FIG. 2 is a conceptual block diagram of the RFID tag of FIG. 1.

FIG. 2 is a conceptual block diagram of the RFID tag 20. The RFID tag 20 includes an RFID antenna 32 coupled to an RFID chip 34. The RFID chip 34 may include one or more of a print counter 36, a stock-keeping unit (SKU) code 38, and a consumable authentication code 40. In embodiments, the RFID 20 tag may include an ICODE® SLIX2 RFD tag (NXP semiconductors, Eindhoven, Netherlands). The RFID tag 20 may communicate with the trace antenna 26 (and ultimately, with a controller coupled to the trace antenna 26) via any suitable communications protocol. In embodiments, the RFID tag 20 communicates with an RFID reader using an NFC (near-field communication) wireless communication protocol, such as one conforming to standard ISO 15693.

While in FIG. 2, a single RFID chip 34 is shown, the RFID tag 20 may include more than one chip, and one or more of print counter 36, a stock-keeping unit (SKU) code 38, and a consumable authentication code 40 may be stored in different chips. Further, one or more of the print counter 36, the stock-keeping unit (SKU) code 38, and the consumable authentication code 40 may be stored in a same memory unit of the RFID chip 34, or in different memory units. For example, one or more may be password-protected, or read-only, or otherwise protected such that only the print counter 36 may be updated during operation, with the SKU code 38 and the authentication code 40 not being modifiable or accessible by a user.

The RFID chip 34 may be configured to update the print counter 36 in response to a counter update signal. For example, the RFID chip 34 may update the print counter 36 in response to the completion of a print job associated with dispensing a single label, or a predetermined number of labels. In some embodiments, the RFID chip 34 may update the print counter 36 in response to a signal indicative of the detection of a single label printed by the print system. For example, each label may be associated with a detectable hole or another feature of the print substrate 14. In some embodiments, the RFID chip 34 may update the print counter 36 in response to a signal indicative of a completion of a print job. The RFID chip 34 itself may receive an external signal, for example, from the controller through the trace antenna 26. For example, the controller may send a counter update signal through the trace antenna 26, received by the RFID antenna 32, to the RFID chip 34, causing RFID chip 34 to update the print counter 36.

In some embodiments, in addition to, or instead of, the print counter 36 on RFID tag 20, another print counter may be present and updated in the controller, or in another chip or component.

The RFID tag 20 is secured to the core 12 such that it rotates about the core axis A. For example, the RFID tag 20 may be secured by adhesive, or by a fastener to a surface of core 12. In some embodiments, the RFID tag 20 is secured to an outer surface of the core 12. In some other embodiments, the RFID tag is secured to an inner surface of the core 12. In some embodiments, the RFID tag 20 may be folded such that it extends between the inner and outer surface of the core 12. For example, the RFID antenna 32 may extend along one of the inner and outer surface, and the RFID chip 34 may extend along the other of the inner and outer surface.

The RFID tag 20 may be placed at any suitable location along the core 12 that facilitates reading of the RFID tag 20, for example, based on an expected position of the trace antenna 26 relative to the print consumable 10. In some embodiments, the RFID tag 20 is secured to the core 12 adjacent one of the first core end 16 or the second core end 18. Such a configuration may facilitate sufficient proximity for detection of the RFID tag by the trace antenna 26, for example, if the trace antenna 26 is placed adjacent the first core end 16 or the second core end 18 of the core 12. Further, such a configuration may facilitate providing the trace antenna 26 in a transverse orientation relative to the RFID tag 20, which may prevent or reduce dead zones, or otherwise promote readability of the RFID tag 20, as described with reference to FIGS. 3 and 4.

Figure 3:
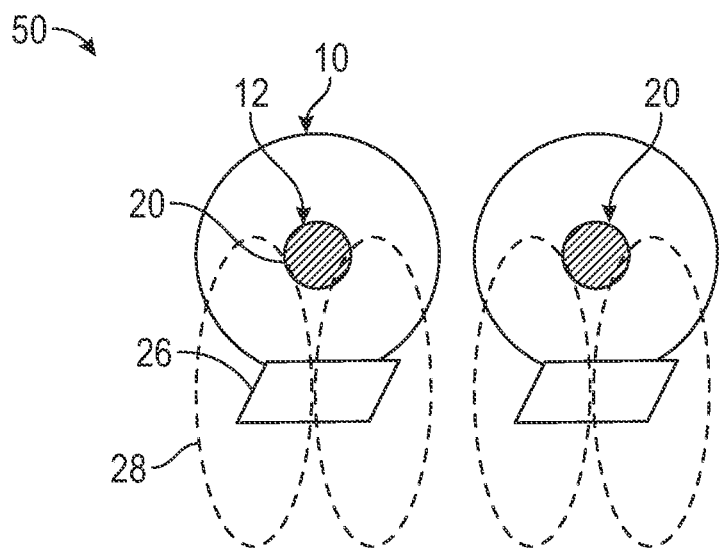
FIG. 3 is a conceptual diagram of an assembly showing RFID dead zones in a parallel orientation of a trace antenna relative to an RFID tag on a cylindrical core.

FIG. 3 is a conceptual diagram of an assembly 50 showing RFID dead zones in a parallel orientation of the trace antenna 26 relative to the RFID tag 20 on the cylindrical core 12. For example, the field 28 generated by the trace antenna 26 may reach the RFID tag 20 in the position on the left, but may not reach the RFID tag 20 in the position on the right. In particular, such a difference in the reach and extent of the field 28 may be present if the trace antenna 26 is placed along a surface of core 12, for example, parallel to or along core axis A. However, such a configuration is in conventional use because of better radio frequency coupling (energy transfer).

Figure 4:
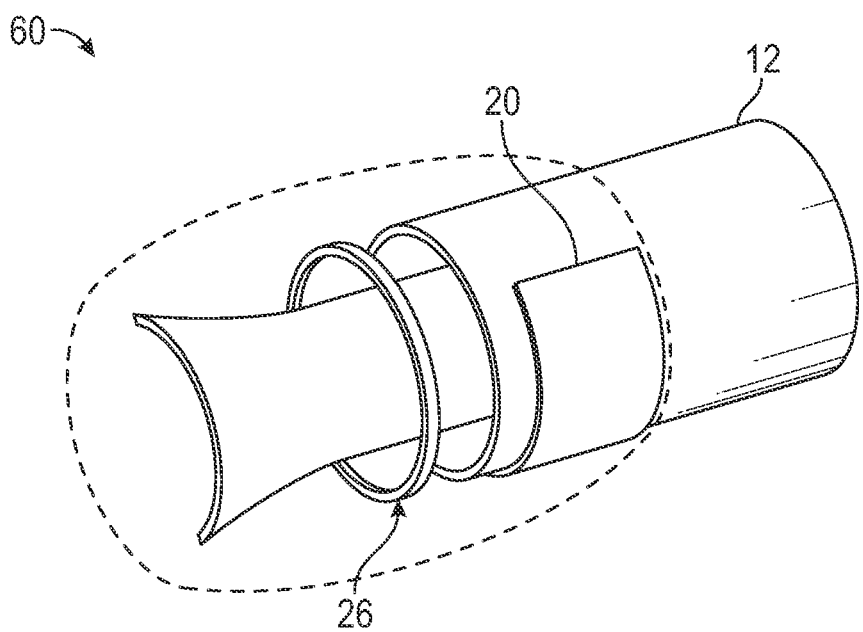
FIG. 4 is a conceptual diagram of an assembly showing an absence of RFID dead zones in a transverse orientation of a trace antenna relative to an RFID tag on a cylindrical core.

FIG. 4 is a conceptual diagram of an assembly 60 showing an absence of RFID dead zones in a transverse orientation of the trace antenna 26 relative to the RFID tag 20 on the cylindrical core 12. In FIG. 4, the trace antenna 26 is transverse to the core axis A of core 12, and is thus transverse to the plane of the RFID tag 20 (or at least to the plane of the RFID antenna 32 of the RFID tag 20) in any rotational position of the RFID tag. While the RF coupling and energy transfer is not optimum in the transverse orientation, such a transverse configuration may provide a uniform readability of the RFID tag 20 regardless of the position of the RFID tag 20 (or the rotation of the core 12). Further, such a configurations avoids the need for multiple trace antennas placed at different angles in view of dead zones. In embodiments, the RFID trace antenna 26 can read the RFID tag 20 in any rotational orientation of the print consumable 10.

Thus, the print consumable 10 may facilitate counting the residual life, setting appropriate print settings according to consumable type or SKU, and allow authentication in a print system. While the print consumable 10 may be in the form of a roll or a cylindrical structure, the print consumable 10 may be provided any suitable shape or geometry. Further, while print consumable 10 may include a roll of the print substrate 14, in some embodiments, the print consumable 10 may include a housing holding, surrounding, or covering a portion or an entirety of the roll. In embodiments, the print consumable 10 may include a cartridge or cassette containing a roll similar to print consumable 10.

Any suitable printing system may be used to print a predetermined pattern on print consumable 10. For example, a print system described with reference to FIGS. 5A to 5C may use print consumables according to the present disclosure.

Figure 5A:
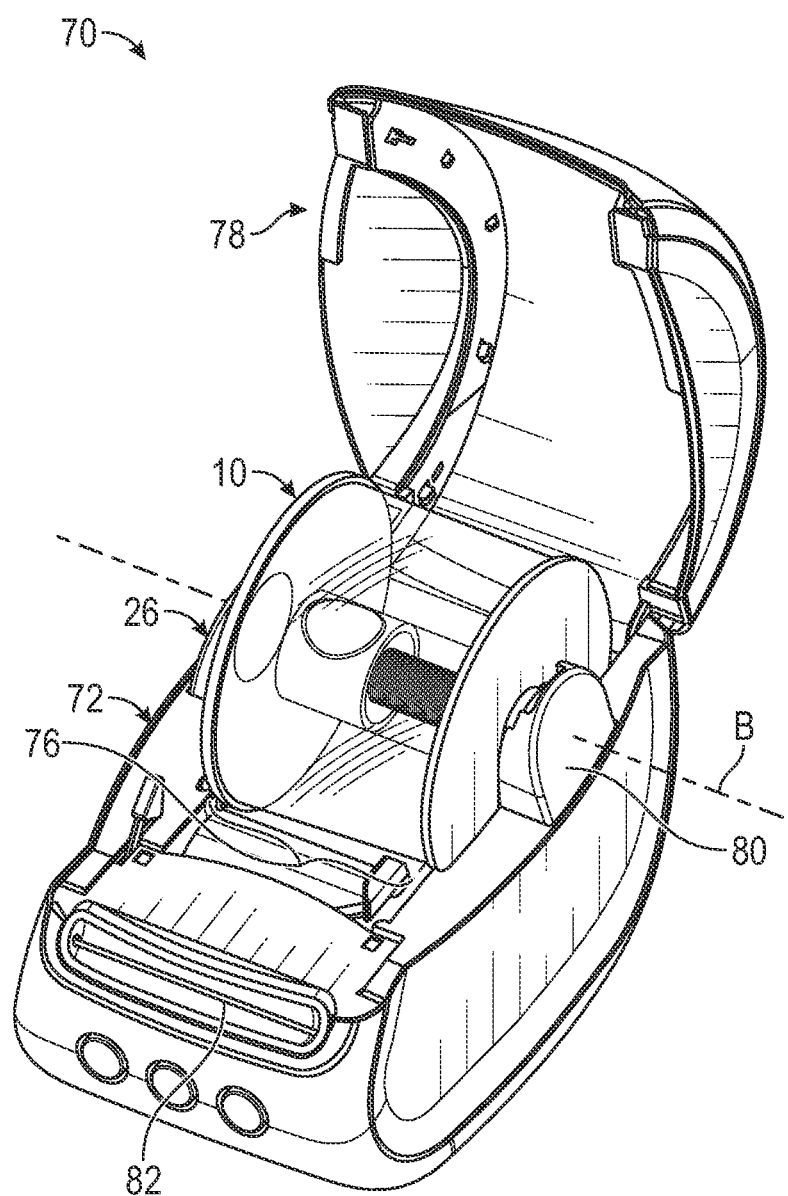
FIG. 5A is a perspective view of a print system in an open-bay configuration, including a housing for holding a print consumable, and a trace antenna for reading an RFID tag of the print consumable.
Figure 5B:
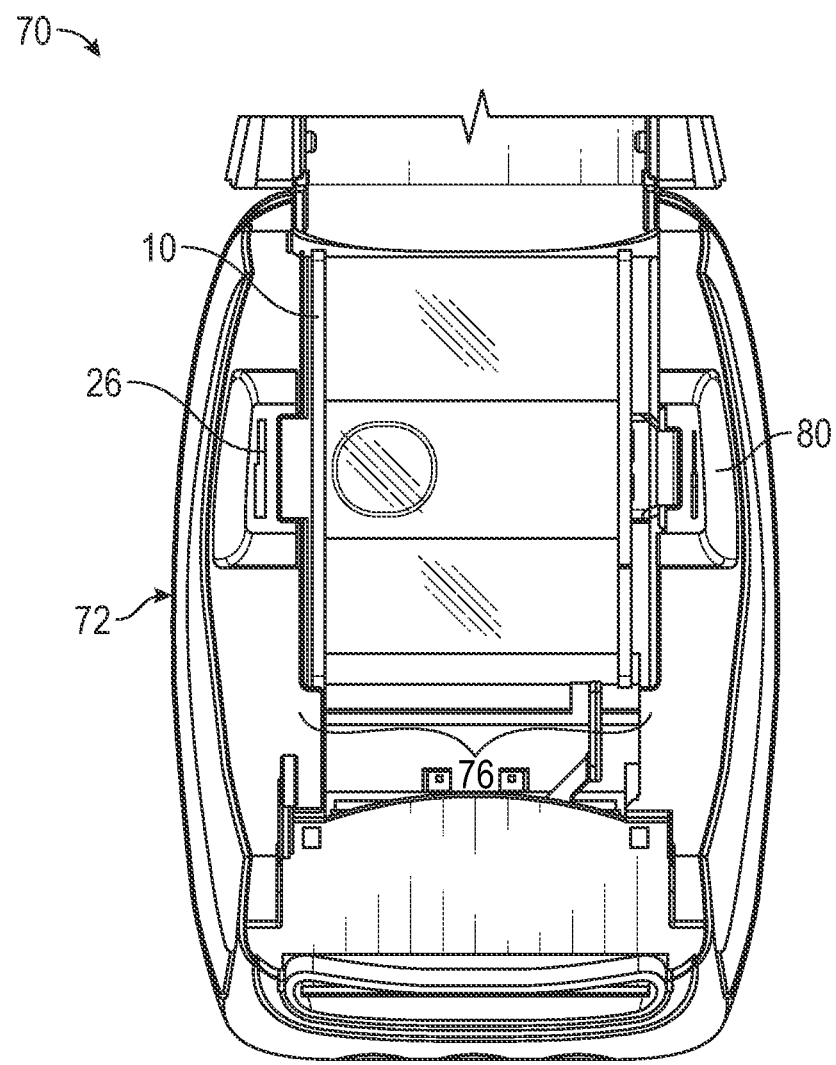
FIG. 5B is a partial top view of the print system of FIG. 5A.
Figure 5C:
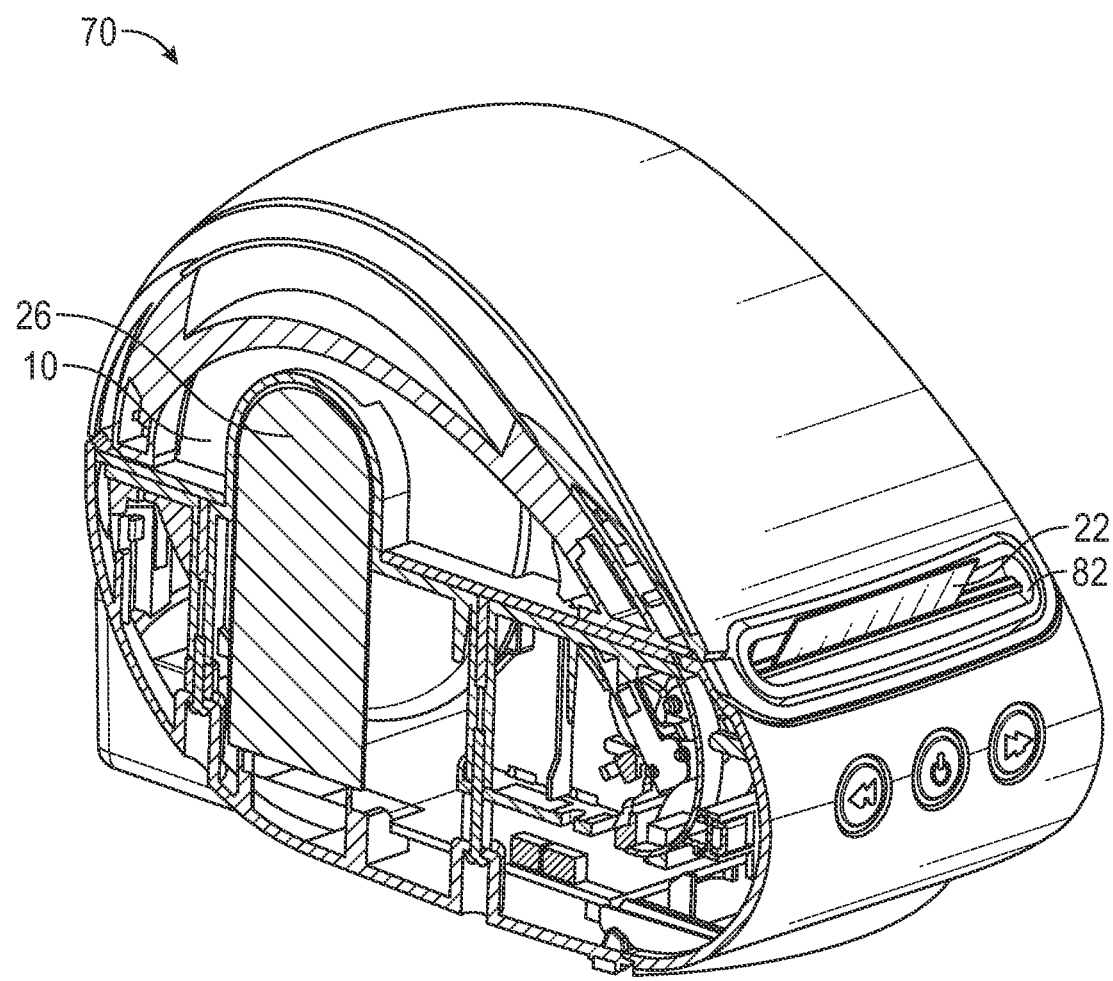
FIG. 5C is a partial exposed cross-sectional perspective view of the print system of FIG. 5A in a closed-bay configuration, showing a transverse orientation of the trace antenna relative to the RFID tag of the print consumable in the bay of the housing.

FIG. 5A is a perspective view of a print system 70 in an open-bay configuration, including a housing 72 for holding the print consumable 10, and the trace antenna 26 for reading the RFID tag 20 of the print consumable 10. FIG. 5B is a partial top view of the print system 70 of FIG. 5A. FIG. 5C is a partial exposed cross-sectional perspective view of the print system 70 of FIG. 5A in a closed-bay configuration, showing a transverse orientation of the trace antenna 26 relative to the RFID tag 20 of the print consumable 10 in the bay of the housing. While the operation of the print system 70 is described with reference to the print consumable 10, the print system 70 may be used with any suitable print consumable.

The housing 72 defines a bay 76 dimensioned to receive the print consumable 10. The bay 76 may be defined by one or more components of the housing 72. In embodiments, at least a portion of the bay 76 may be defined by a base of the housing 72. In embodiments, at least a portion of the bay 76 may be defined by a lid 78 of the housing 72. For example, the bay 76 may be defined between a base and the lid 78 of the housing 72. The bay 76 is dimensioned to receive and accommodate the print consumable 10, and allow print consumable 10 to dispense print substrate.

The housing 72 may include a holder 80 configured to secure the print consumable 10 about a rotation axis B aligned with the core axis 12. For example, the holder 80 may include two holder portions at sides of the housing 72, and the core 12 (and ultimately, the roll of the print substrate 14) may be held between the holder portions of the holder 80. While two holder portions are shown in FIG. 5A, the housing 72 may include a single holder portion in other embodiments. The RFID trace antenna 26 is adjacent the holder 80 such that the RFID tag 20 is adjacent the RFID trace antenna 26 when the print consumable 10 is secured to the holder 80. One or more portions of the holder may extend partly through a hollow interior of the core 12, or may securely engage and end surface of the core 12. In some embodiments, the holder 80 may include a motor for rotating the core 12, or a gear or other rotating component mechanically rotatably coupled to a motor.

The print system 70 includes a print head (not visible in FIG. 5A) configured to print a pattern on the print substrate 14. For example, the print head may be adjacent a dispensing slot 82 of the housing 72, through which a printed portion of the print substrate is dispensed. The print head may include an inkjet head, a laser head, a thermal print head, or any suitable printing mechanism. Print system 70 may include a reservoir for storing ink, pigment, or toner, or otherwise receive ink, pigment, or toner through a cartridge or cassette internal to print system 70, or from a container external to print system 70.

The print system 70 further includes the trace antenna 26 configured to read the RFID tag 20. In some embodiments, the trace antenna 26 is parallel to a portion of the holder 80, or extends within a holder 80. In embodiments, the trace antenna 26 extends in a direction transverse to the rotation axis B (and thus also transverse to the core axis A). While trace antenna 26 may be exactly perpendicular to the rotation axis B, defining a relative angle of 90°, in other examples, trace antenna may be angled in a range close to 90°, for example, 90°±20°, 90°±15°, 90°±10°, 90°±5°, 90°±3°, 90°±2°, or 90°±1°. Further, it is understood that manufacturing and measurement tolerances may result in a slight deviation from an angle of 90°, or from any other predetermined angle or dimension.

Figure 6:
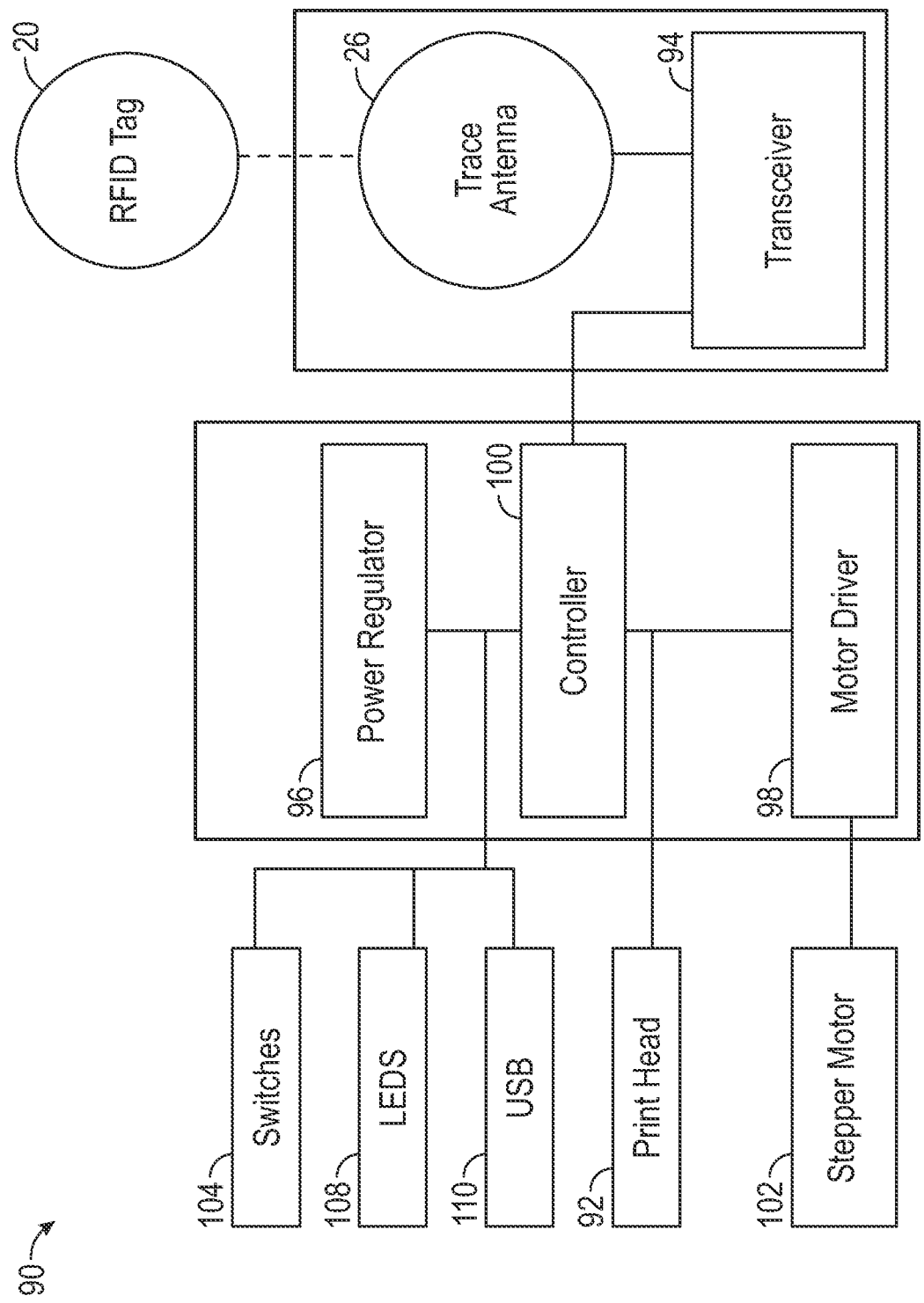
FIG. 6 is a conceptual block diagram of a control assembly of the print system of FIGS. 5A to 5C, including a print head, a transceiver, and a controller for controlling various components of the print system.

The print system 70 may include a transceiver (not shown in FIG. 5A) coupled to the trace antenna 26, and a controller (not shown in FIG. 5A) coupled to the transceiver. FIG. 6 is a conceptual block diagram of a control assembly 90 of the print system 70 of FIGS. 5A to 5C, including a print head 92, a transceiver 94, and a controller 100 for controlling various components of the print system 70. The control assembly may further include additional components such as a power regulator 96 and a motor driver 98.

The controller 100 is configured to receive a signal from the transceiver 94 indicative of one or more of the print counter 36, the SKU code 38, and the consumable authentication code 40 received from the RFID antenna 32. The controller 100 may also send signals to the RFID chip 34 through the transceiver 94 and RFID antenna 32. The RFID chip 34 may update the print counter 36 in response to a signal sent by the controller 100 via the transceiver and received by the RFID tag 20 through the RFID antenna 32. For example, the controller 100 may be further configured to send a counter update signal to the transceiver 94 for transmission to the RFID tag 20, where the RFID chip 34 is configured to update the print counter 36 in response to the counter update signal.

In embodiments, the controller 100 is further configured to modify print settings for the print head 92 in response to the SKU code 38. For example, the SKU code 38 may be associated with dimensions and substrate material of the print substrate 14, such as label dimensions, and with the number of labels or print capacity of the print consumable. Thus, based on the SKU code 38, the controller 100 may set appropriate print settings, such as print area, margins, label template, dots per inch (DPI), print quality, and the like. The controller 100 may also determine a residual capacity of the print consumable 10 based on the initial capacity and the present capacity associated with the value of the print counter 36.

In embodiments, the controller 100 is further configured to permit or prevent operation of the print system 70 in response to the consumable authentication code 40. For example, if the authentication code detected by the controller is associated with a party authorized to manufacture a genuine and compatible print consumable 10, the controller 100 may set print settings and send signals to the print head 92 to initiate printing. The controller 100 may also send signals to the motor driver 98, which ultimately drivers a stepper motor 102, to cause a predetermined rotation of the print consumable 10 to dispense a printed portion of the print substrate 14. The stepper motor 102 is configured to rotate the print consumable 10 secured to the holder 80 about the rotation axis B. In contrast, if the authentication code is not associated with an authorized party or manufacturer, controller 100 will not send signals to the print head 92 and/or the motor driver 98, and thus prevent the operation of the print system 70.

The control assembly 90 may include further components to connect or control other components of the print system 70. For example, print system 70 may include one or more switches 104, LEDs (light emitting diodes) 108, or network connections 110 (for example, a USB hub), and the controller 100 or another component of the control assembly may receive or send signals to operate such components.

The pattern to be printed by print system 70 may be received through the network connection 110. While a wired (USB) network connection 110 is shown in FIG. 6, in other embodiments, print system 70 may include one or both of wireless or wired network controllers to receive print patterns, user print settings, or firmware updates.

Print consumables and systems according to the present disclosure, for example, the print consumable 10 and print system 70, may be used together to provide functions and features described throughout the present disclosure. Embodiments of methods are described with reference to print consumable 10, print system 70, and control assembly 90. However, such methods may be practiced using any suitable consumables, systems, and assemblies according to the disclosure.

For example, a method for authenticating a source of the print consumable 10 secured in the print system 70 may include receiving, by the controller 100, a signal from the transceiver 94 indicative of the consumable authentication code 40 from the RFID tag 20. The method may include authenticating, by the controller 100, the source of the print consumable 10 based on the consumable authentication code 40. The method may further include permitting or preventing operation of the print system, by the controller 100, in response to the source of the print consumable 10.

In embodiments, a method for setting print settings for the print consumable 10 secured in the print system 70 includes receiving, by the controller 100, a signal from the transceiver 94 indicative of the SKU code 38 from the RFID tag 20, and setting, by the controller 100, print settings suitable for the print consumable 10 based on the SKU code 38. For example, the controller 100 may set print settings such as print area, margin, substrate type, and the like for the print head 92.

In embodiments, a method for updating a print counter 36 for the print consumable 10 secured in the print system 70 includes, before a print job, receiving, by the controller 100, a signal from the transceiver 94 indicative of the print counter 36 from the RFID tag 20, and after the print job, sending, by the controller, a counter update signal to the RFID tag 20.

In embodiments, the controller 100 may detect a feature such as a hole associated with a single label, and send a counter update signal in response to the detection of a label to the RFID tag 20. In such embodiments, the RFID chip 34 of the RFID tag 20 updates the print counter 36 in response to the counter update signal.

In embodiments, the controller 100 may detect the advancing or printing of a label by detecting the displacement of stepper motor and based on a predetermined length of the label. For example, the SKU code 38 may be associated with predetermined label dimensions, such as label length. In some embodiments, the length of a label may be associated with a predetermined number of stepper motor pulses. In some embodiments, the number of measured step pulses divided by a predetermined expected step pulses per label may be used to detect the label count associated with the measured step pulses.

The print counter 36 may be used to alert the user as the capacity of the consumable is approached. In embodiments, the method further includes generating an alert, by the controller 100, in response to determining that the print counter 36 is within a predetermined threshold of a maximum print count associated with the print consumable 10. The maximum print count may be determined based on the SKU code 38. For example, an embedded counter in an ICODE SLIX2 chip may be used to store a count of printed units or labels. In embodiments, the counter has a monotonic function, can only count upwards, and can only be incremented by 1 unit on each access. For example, each time the RFID tag 20 is read, the counter is incremented by 1 unit. In some embodiments, each time a counter update signal is sent by the controller 100 to the RFID chip 34, the RFID chip increments the print counter 36 by 1 unit. The initial counter value may be set to a maximum counter value minus the sum of the label count of a full roll and the margin, where the margin provides a threshold to alert a user to change the consumable as end of capacity approaches. The counter may be set during production with other SKU parameters.

Figure 7:
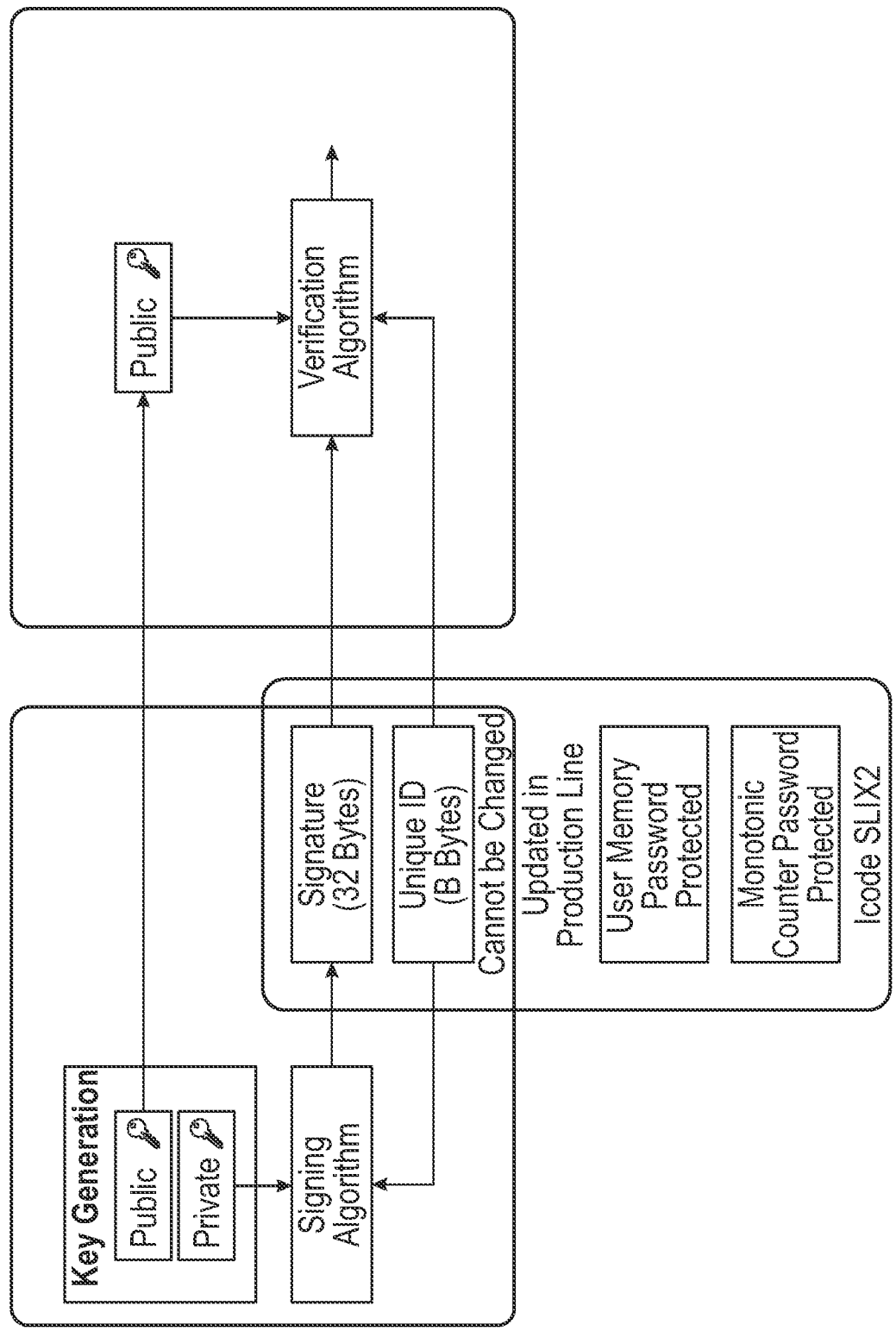
FIG. 7 is a conceptual block diagram showing authentication of a print consumable using RFID components.

FIG. 7 is a conceptual block diagram showing authentication of a print consumable using RFID components. A signing algorithm may be used to provide a signature based on a private key, and each RFID tag may have a unique ID. For example, the signature may be initially set based on the unique ID and the private and public key pair, using ECC (Elliptic Curve Cryptography) calculation (ECDSA—128 bit). A verification algorithm may use a public key and the associated unique ID to verify the signature and authenticate the source of the RFID tag 20 (and thus, the source of the consumable 10). The signature, once assigned to the RFID tag, cannot be changed by the end user. In embodiments, the authentication code 40 includes the signature.

In contrast, the print counter 36 and SKU code 38 are present in an accessible, but password-protected memory. Thus, the manufacturer of the consumable 10 may apply any RFID tag 20 to the consumable 10, and assign an SKU code 38 to the tag.

While the disclosure has been described with reference to a number of embodiments, it will be understood by those skilled in the art that the disclosure is not limited to such disclosed embodiments. Rather, the disclosure can be modified to incorporate any number of variations, alterations, substitutions, or equivalent arrangements not described herein, but which are commensurate with the spirit and scope of the disclosure. Conditional language used herein, such as "can," "could," "might," or "may," unless specifically stated otherwise, or otherwise understood within the context as used, generally is intended to convey that certain embodiments include, while other embodiments do not include, certain features, elements or functional capabilities. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A print consumable comprising:
    a rotatable core extending along a core axis between a first core end and a second core end;
    a roll of dispensable print substrate dispensably secured to the core about the core axis; and
    a radio-frequency identification (RFID) tag secured to the core adjacent the first core end or the second core end and configured to rotate about the core axis, wherein the RFID tag comprises an RFID antenna coupled to an RFID chip, and wherein the RFID chip comprises a print counter, a stock-keeping unit (SKU) code, and a consumable authentication code; and
    wherein the print counter and the SKU code are password-protected, and wherein the consumable authentication code is not modifiable.

2. The print consumable of claim 1, wherein the dispensable print substrate comprises a plurality of labels secured to a backing layer.

3. The print consumable of claim 1, wherein the rotatable core has a hollow cylindrical shape defining an outer surface and an inner surface.

4. The print consumable of claim 1, wherein the RFID tag is secured to an outer surface of the core.

5. The print consumable of claim 1, wherein the RFID tag is secured to an inner surface of the core.

6. The print consumable of claim 1, wherein the RFID chip is configured to update the print counter in response to a signal indicative of a completion of a print job.

7. A method for authenticating a source of the print consumable of claim 1 in a print system, the method comprising:
receiving, by a controller, a signal from a transceiver indicative of the consumable authentication code from the RFID tag;
authenticating, by the controller, the source of the print consumable based on the consumable authentication code; and
permitting or preventing operation of the print system, by the controller, in response to the source of the print consumable.

8. A method for setting print settings for the print consumable of claim 1 secured in a print system, the method comprising:
receiving, by a controller, a signal from a transceiver indicative of the SKU code from the RFID tag; and
setting, by the controller, print settings suitable for the print consumable based on the SKU code.

9. A method for updating a print counter for the print consumable of claim 1 secured in a print system, the method comprising:
before a print job, receiving, by a controller, a signal from a transceiver indicative of the print counter from an RFID tag; and
after the print job, sending, by the controller, a counter update signal to the RFID tag.

10. The method of claim 9, further comprising generating an alert, by the controller, in response to determining that the value of the print counter is within a predetermined threshold of a maximum print count associated with the print consumable.

11. A print system comprising:
a housing defining a bay dimensioned to receive a print consumable, the print consumable comprising:
a rotatable core extending along a core axis between a first core end and a second core end;
a roll of dispensable print substrate dispensably secured to the core about the core axis; and
a radio-frequency identification (RFID) tag secured to the core adjacent the first core end or the second core end and configured to rotate about the core axis, wherein the RFID tag comprises an RFID antenna coupled to an RFID chip, and wherein the RFID chip comprises a print counter, a stock-keeping unit (SKU) code, and a consumable authentication code; and
wherein the print counter and the SKU code are password-protected, and wherein the consumable authentication code is not modifiable;
a holder configured to secure the print consumable about a rotation axis aligned with the core axis;
a print head configured to print a pattern on the print substrate;
a trace antenna configured to read the RFID tag, wherein the trace antenna extends in a direction transverse to the rotation axis;
a transceiver coupled to the trace antenna; and
a controller coupled to the transceiver,
wherein the controller is configured to receive a signal from the transceiver indicative of one or more of the print counter, the SKU code, and the consumable authentication code received from the RFID antenna.

12. The print system of claim 11, wherein the controller is further configured to send a counter update signal to the transceiver for transmission to the RFID tag, and wherein the RFID chip is configured to update the print counter in response to the counter update signal.

13. The print system of claim 11, wherein the controller is further configured to modify print settings for the print head in response to the SKU code.

14. The print system of claim 11, wherein the controller is further configured to permit or prevent operation of the print system in response to the consumable authentication code.

15. The print system of claim 11, wherein the RFID trace antenna is adjacent the holder such that the RFID tag is adjacent the RFID trace antenna when the print consumable is secured to the holder.

16. The print system of claim 11, wherein the RFID trace antenna can read the RFID tag in any rotational orientation of the print consumable.

17. The print system of claim 11, wherein the housing further defines a dispensing slot through which the print consumable is dispensed.

18. The print system of claim 11, further comprising a print head configured to print a predetermined pattern on print surface of the print consumable.

19. The print system of claim 11, further comprising a stepper motor configured to rotate the print consumable secured to the holder about the rotation axis, wherein the rotation axis is aligned with the core axis.

* * * * *